July 14, 1953 H. M. VEAUX 2,645,770

TIME DIVISION MULTIPLEX RADIO SYSTEM

Filed Feb. 15, 1949 2 Sheets-Sheet 1

DELAY LINE

INVENTOR

H. M. VEAUX

BY Robert Harding Jr.

ATTORNEY

July 14, 1953 H. M. VEAUX 2,645,770

TIME DIVISION MULTIPLEX RADIO SYSTEM

Filed Feb. 15, 1949 2 Sheets-Sheet 2

INVENTOR
H. M. VEAUX
BY Robert Harding Jr.
ATTORNEY

Patented July 14, 1953 2,645,770

UNITED STATES PATENT OFFICE 2,645,770

TIME DIVISION MULTIPLEX RADIO SYSTEM

Henri Maurice Veaux, Saint-Leu-la-Foret, France

Application February 15, 1949, Serial No. 76,507
In France February 16, 1948

5 Claims. (Cl. 343—204)

The present invention concerns the use of one or several delay lines associated with a switching device. The invention is in fact an extension of the application of the system which is the object of my copending patent application, Serial No. 54,395, filed October 14, 1948, now abandoned, under the title: Use of a Delay Line With Multiple Tappings as a Means for the Storing and Alteration of Duration of Signals," and my copending application, Ser. No. 54,394, filed October 14, 1948, now Pat. No. 2,585,058, granted February 12, 1952, under the title: "System for Connecting a Radio Station to a Telephony Network Utilizing the Same Frequency Band for the Two Directions of Transmission," and my copending aplication, Serial No. 58,705, filed November 6, 1948, under the title: "System for Altering the Duration of Signals."

The first mentioned application gives principally a new realisation of the system described in French Patent No. 932,934 in view of reducing the time taken by a telephonic, phototelegraphic or television transmission.

The first object of the present invention consists in determining with all the desirable accuracy the conditions of operation and of the use of the embodiment disclosed in French Patent No. 932,934 in which the inscription on an iconoscope mosaic is replaced by the temporary storing of the signals in a delay line.

Figures 1, 2, 3, 4, 5:
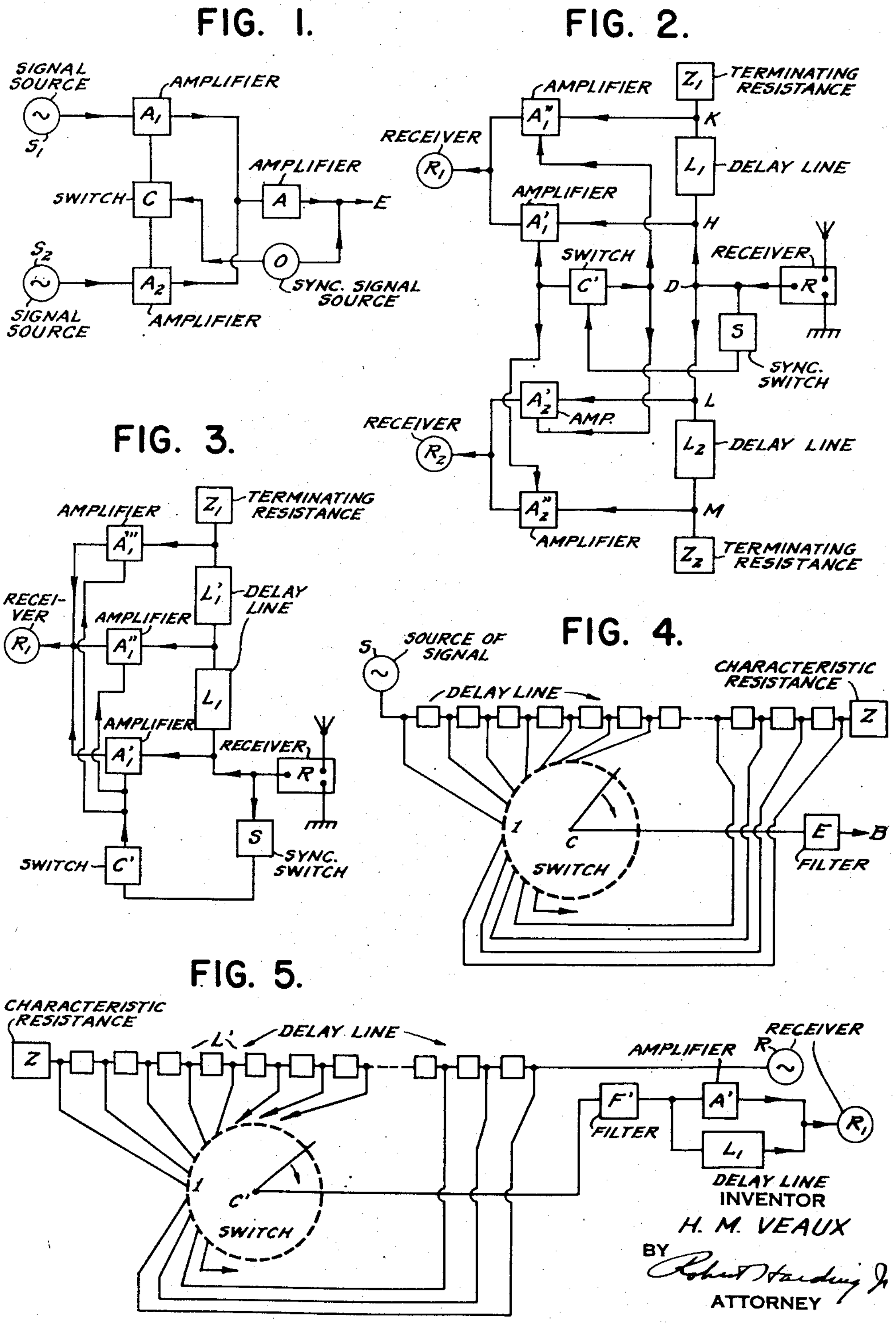
Fig. 1 is a schematic diagram of a known multiplex transmitting circuit.
Fig. 2 is a schematic diagram of a two channel receiving circuit embodying the invention.
Fig. 3 is a schematic diagram of a three channel receiving circuit embodying the invention.
Fig. 4 is a schematic diagram of a modified form of transmitting circuit.
Fig. 5 is a schematic diagram of a modified form of receiving circuit.

Fig. 1 corresponds to the simple case of two transmissions coming from two signal sources $S_1$ and $S_2$ (telephony signals, for example); it does not differ in any way, in its principle, from Figure 1 of French Patent No. 932,934 adapted to the case of three channels. A switch C unlocks alternately the two amplifiers $A_1$ and $A_2$ supplied from two sources $S_1$ and $S_2$; the signals picked up at the input of amplifier A are thus made up of equal alternative trains coming from $S_1$ and $S_2$; a source of synchronising signals O controls the alternative unlocking of the two channels and transmits at the output at E synchronising signals useful for the reception.

The invention concerns the reception as shown by the general indications of Fig. 2; it consists in separating the trains belonging alternately to one and the other channel and in switching them to the corresponding terminal receivers directly and indirectly through a delay line; each train belonging to a channel arrives on the terminal receiver directly and through a delay line; the train coming from the delay line gives a repetition of the train directly received and, in this way, fills in the free interval between two original consecutive trains.

Figure 2 and the following numerical values given by way of information will remove all ambiguity regarding the real object of the invention. The signal trains delivered after detection by the radioelectric receiver R supply at point D the delay lines $L_1$ and $L_2$ which terminate on the characteristic resistances $Z_1$ and $Z_2$. Receiver $R_1$ of channel 1 is alternatively fed from amplifiers $A'_1$ and $A''_1$ driven respectively at points H and K; a similar process feeds the receiver $R_2$ of channel 2; a switch C' alternately unlocks the amplifiers $A'_1$, $A''_1$, $A'_2$ and $A''_2$ distributed in two groups ($A'_1$, $A''_2$) and ($A''_1$, $A'_2$); the cadence of the switching is phase controlled, starting from the separating synchronising signals of the trains switched over at S at the output of R. The operating mechanism is established as follows: switch C (Fig. 1) alternately unlocks amplifiers $A_1$ and $A_2$ according to a periodicity of 10 milliseconds; the alternative trains which each have a duration of 10 milliseconds are restored at D (Fig. 2) at the output of receiver R; the delay of lines $L_1$ and $L_2$ in the entire band to be transmitted (3,000 C./S. in commercial telephony) is fixed at the value of 10 milliseconds; the beginning of an impulse train belonging to channel 1 enters simultaneously at H and L the amplifiers $A'_1$ and $A'_2$; at the same moment, switch C' effects the unblocking of $A'_1$ and $A''_2$ and the blocking of $A''_1$ and $A'_2$: for 10 milliseconds, the train of channel 1 supplies directly and through $A'_1$ the corresponding receiver $R_1$, whilst the preceding train of channel 2, previously stored in $L_2$ during the preceding 10 milliseconds period, supplies receiver $R_2$; during this period, the train of channel 1 is propagated through $L_1$ and $L_2$ and ends at points K and M at the beginning of the following period of 10 milliseconds; at this same point, switch C′ unblocks amplifiers $A''_1$ and $A'_2$ and blocks amplifiers $A'_1$ and $A''_2$ during the period of 10 milliseconds which follows: the impulse train of channel 1 is transmitted to receiver $R_1$ through amplifier $A''_1$, whilst receiver $R_2$ receives through $A'_2$ the following impulse train belonging to channel 2.

To sum up, one same train of channel 1 is alternatively received by feeding processes starting from points H and K; the damping in $L_1$ is compensated by an equivalent increase of the amplification of $A''_1$ with respect to $A'_1$; the results are similar for channel 2.

The suppression of the sending of the phase signals of switches C and C′ brings about a considerable simplification; a well known technique enables this phase adjustment to be maintained without difficulty for a very long time, longer than the time taken for the longest conversation; a control at the receiving end of the signals picked up on channels 1 and 2 enables the phase of switch C′ to be regulated at any moment. The system can be adapted, naturally, to single side band transmission systems. With a view to avoiding cross-talk between channels due to reverberation effects in propagation, successive trains at 8 M./S., for example, can be slightly shortened at the transmitting end, without affecting the receiving arrangement. The system can be adapted to the case of more than two channels.

Figure 3 corresponds to the receiving arrangement for three channels. The trains belonging successively to the three channels have, for example, a duration of 6 milliseconds; Figure 3 only gives the parts of a single channel 1 supplying the receiver $R_1$. The delays of lines $L_1$ and $L'_1$ are fixed at 6 milliseconds. A same train directly received through $A'_1$ is successively repeated through $A''_1$ and $A'''_1$ the amplifications of which are regulated so as to compensate the dampings or attenuation.

The system can be used for the case of a wire or cable transmission. In a multiplex transmission with numerous channels, on a coaxial cable, for example, the numerous telephonic channels can be grouped two by two, three by three, etc. The same switches C and C′ can be utilised at both ends of the cable to control simultaneously the blocking and unblocking operations on the various groups. A permanent coupling may ensure the phase adjustment of the switches C and C′.

In phototelegraphy, the signal trains obtained at the sending end (Fig. 1) one and the other channel starting from the phototelegraphy apparatus $S_1$ and $S_2$ can be regulated to the duration of one revolution of the cylinder bearing the images to be transmitted; the lines $L_1$ and $L_2$ of Fig. 2 are regulated with a delay corresponding to this value. In television, the signal trains can be adapted to the duration of transmission of a line or of an image.

The first-mentioned application Ser. No. 54,395 gives principally a new realisation of the system described in French Patent No. 932,934 in view of reducing the band of frequencies occupied by a telephonic, photo-telegraphic or television transmission. The second object of the present invention consists in determining with all the desirable accuracy the conditions of operation and utilisation of the embodiment of the above mentioned system in which the time conversion as from an inscription and a reading of the signals on the mosaic of an iconoscope are replaced by the temporary storing of the signals in a delay line with multiple tappings and by the reading of these same signals at the desired speed by a rapid exploration of the tappings of the delay line. In short, the invention consists in:

(1) Picking up, at the transmitting end, signal trains of the same duration separated by free intervals and regularly distributing the signals of each train over the time which separates the beginning of two successive trains, in such a way as to obtain prolonged trains;

(2) Reestablishing, at the receiving end, each prolonged train to the duration of the initial train and repeating each train thus reestablished so as to suppress or to reduce any unwanted intervals in the transmission.

(3) Utilising for the time conversions delay lines with multiple tappings associated with switches and, for the repetitions, delay lines giving at their output a repetition of the input signals.

Figs. 4 and 5 and the following numerical data given by way of information will remove all ambiguity regarding the real object of the invention:

At the transmitting end (Fig. 4), the source of signals S supplies the multiple tapped delay line L terminated on its characteristic resistance Z and associated with switch C, the exploration of whose tappings in the direction of the arrow give time converted signals at output B, through the filter amplifier F. For a total delay of line $\theta$ and an exploration frequency of the switch at a rate of $N_1$ turns per second, every signal from the source S of frequency N gives, at the output, a frequency signal:

$$F=N(1-\theta N_1) \quad (1)$$

each prolonged train presents a duration $$T_1=\frac{1}{N_1}$$

and corresponds to a period of signals delivered by S of duration $(T_1-\theta)$.

At the receiving end (Fig. 5), the radioelectric receiver R feeds a delay line L′ of the same delay $\theta$ as that of line L of the transmitting end. The tappings made on L′ through switch C′ exploring in the direction of the arrow, effect a reestablishment of the prolonged trains to their original duration, the trains obtained feed the receiver $R_1$ through a filter amplifier F′, either directly by means of amplifier A′, or indirectly through one or several delay lines (Fig. 5 gives only one indirect feeding system $L_1$) which supply the desired repetitions intended to fill in the free intervals.

The sending of phasing signals during the exploring movements of switches C and C′ is not indispensable in practice as is shown in the explanations given above with regard to Figs. 1 and 2.

The following numerical data, given by way of information, concern a commercial telephony transmission. The band of signals supplied by S (200 to 3,000 C./S.) is reduced at the output at B to the limits (100–1,500). The duration of the delay of line L has a value of $\theta$=10 milliseconds. With respect to (1) we have $$N_1=\frac{1}{2\theta}=50 \text{ T./S.}$$

i. e. $T_1=2\theta=20$ milliseconds; each revolution, in 20 milliseconds, of C gives the exploration of a portion of 10 milliseconds, of the signals supplied for S. A number of tappings equal to $8\theta$ on line L is suitable. The delay of line L' at the receiving end is $\theta=10$ milliseconds. The signals supplied by R, occupying the band comprised between 100 and 1,500, are restored by C' to their original band (200–3,000) by C' rotating at a speed:

$$N'_1=\frac{1}{\theta}=100 \text{ T./S.}$$

i. e. $T'=\theta=10$ milliseconds. A number of tappings equal to 80 on line L' is suitable. The trains restored at the output of F' have a duration $\theta$ and are separated by intervals of $\theta$ duration; the delay line $L_1$, with a delay $\theta$, supplies signals intended to fill in the free intervals.

The weakening of the signals during their propagation over the delay lines can be compensated by a variable amplification effected in synchronism. The compensation can also be obtained between successive lines scanned differently at the transmitting end and at the receiving end: a train scanned at L, starting from terminal 1 is subjected from the beginning to the end to an alternation compensated by a gain during the scanning at the receiving end following line L'. In practical working conditions, the parts shown in Figs. 4 and 5 are, with the exception of the source of signals S, the radioelectric receiver R and the receiver $R_1$, installed at the same phase (link center to the telephone network for telephony). The phase and synchronising control of switches C and and C' can be effected from a common source.

The present invention comprises a combination of parts with a view principally to reducing the frequency band occupied by a radioelectric transmission of the above mentioned devices and of the devices described in the above mentioned application, Serial No. 54,394.

Figures 6, 7:
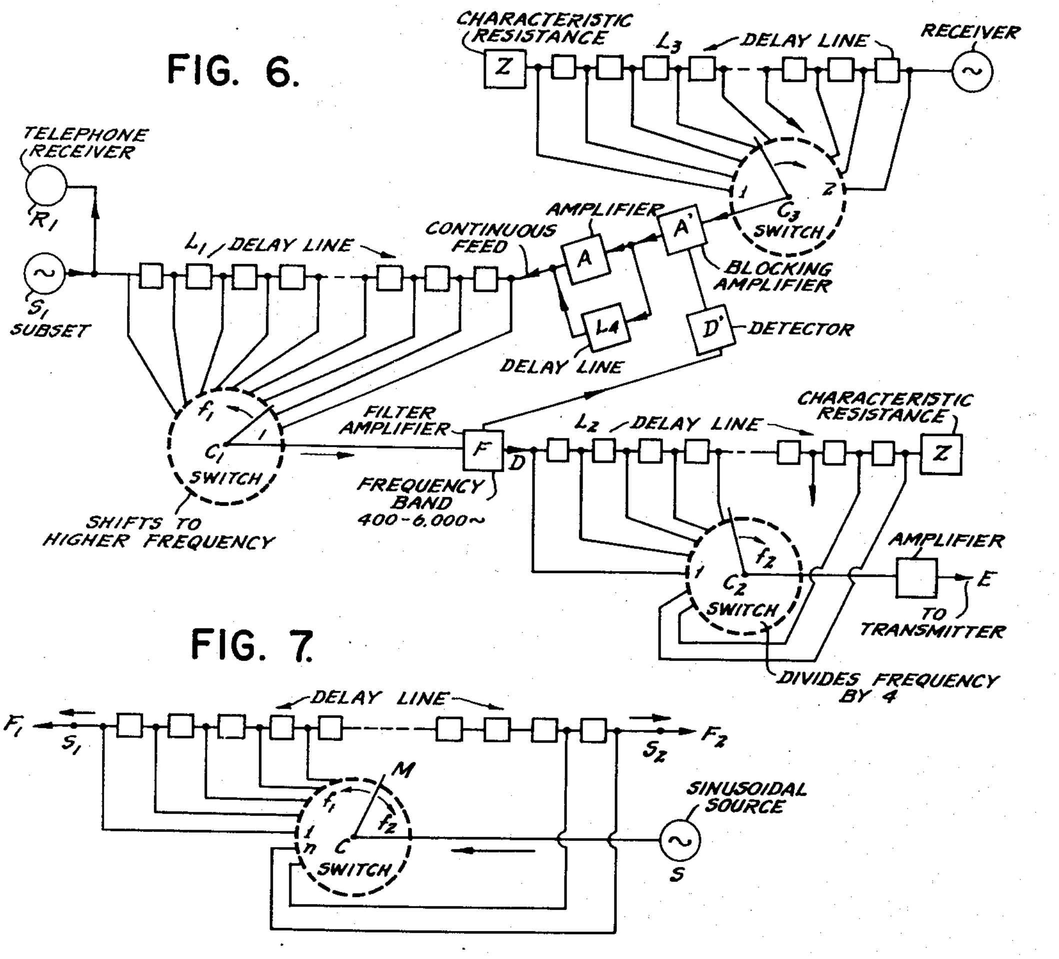
Fig. 6 is a schematic diagram of a commercial telephone system embodying the invention.
Fig. 7 is a schematic diagram of a known arrangement for altering the duration of signals.

Fig. 6 shows the general set-up of a commercial telephone system associated with a telephone network. The subscriber of the network possesses a micro-telephone or sub-set $S_1$ associated with a receiver $R_1$. The switch $C_1$ associated with the delay line $L_1$ gives by rotation in the direction of arrow $f_1$ the conversion of duration (multiplication by two of the frequencies) of the signals emanating from $S_1$.

The signals emanating from D in the filter amplifier F have a frequency band limited between 400 and 6,000 cycles per second for a frequency band occupied by the signals emanating from $S_1$ and comprised between the values 200 and 3,000 cycles per second. For a division by 4 of the frequency of the signals emanating from D inverse conversion is produced, by means of switch $C_2$ associated with line $L_2$ and signals are obtained in E which are used for the modulation of the radio electric transmitter, the signals occupying the frequency band between 100 and 1,500 cycles per second.

The following data given as an indication will determine a mode of operation acceptable for the direction of the transmitter. The switch $C_1$ comprises 80 tappings distributed over the quarter of a circumference and associated with 80 cells of the line $L_1$ the delay of which is equal to 5 milliseconds. The scanning in five milliseconds in the direction of arrow $f_1$ of the anodes of the switch give, during the passage from anode 1 to anode 2, a signal train of a duration of 5 milliseconds representing a signal train transmitted in 10 milliseconds from source $S_1$. At the start of the scanning of $C_1$ on terminal 1, for instance, the scanning of $C_2$ begins on terminal 1 in the direction of arrow $f_2$. The speed of scanning of $C_2$ being the same as that of $C_1$ at a rate of one revolution in 20 milliseconds (i. e. $N_1=50$ t./sec.) the total delay $\theta$ of line $L_2$ is adjusted at such a value that $$(1-\theta N_1)=\frac{1}{4}$$

that is $\theta=15$ milliseconds. There is explored in this way at each revolution of $C_2$ in 20 milliseconds a train of 5 milliseconds emanating from D, i. e., a portion representing half of the signals supplied by source $S_1$. A suitable definition of the signals in the output E (at a rate of 8,000 impulses for a frequency of 3,000) is obtained by means of a switch $C_2$ having 80 electrodes (80 impulses for one rotation of $C_2$ in 20 milliseconds). The condition of phase in the scanning of $C_1$ and $C_2$ does not present any difficulty; the same supply source provides the scanning motion of $C_1$ and $C_2$.

At the receiver the signals supplied by the radio-electric receiver R by portions of 20 milliseconds' duration are compressed in duration inversely by means of a switch $C_3$ associated with line $L_3$. Each train of 20 milliseconds lying in a frequency band comprised between 100 and 1,500 cycles per second is transformed at the output of $C_3$ into a train the duration of which is equal to 10 milliseconds which is halved in the receiver $R_1$ by directly traversing the branch of the amplifier A and indirectly a branch of a delay line $L_4$ giving a delay of 10 milliseconds. The switch $C_3$ which rotates at a speed of 50 revolutions per second scans the electrodes fed from tappings provided on the delay line $L_3$ and giving a delay of 10 milliseconds. The tappings on line $L_3$ feed 80 electrodes of $C_3$ distributed according to the upper half circle. A train of signals of 20 milliseconds emanating from R and occupying the frequency band limited between 100 and 1,500 cycles per second gives at the output of $C_3$ a train of 10 milliseconds' duration which traverses directly A and is halved through $L_4$ for feeding $R_1$ in a continuous manner. Feedbacks towards $R_1$ of signals from $S_1$ along the route $RL_1R_1$ are avoided by blocking amplifier A' under the influence of currents collected through a detector D' by means of currents delivered by the amplifier filter F. It is also possible to operate the blocking as from D' of any one of the devices of the chain of transmission emanating from R (also extinction or switching off or blocking of the beam of the switch $C_3$).

With the distribution of electrodes adopted, the switches $C_1C_2$ and $C_3$ rotate at the same speed. It is possible to adopt a uniform distribution of the electrodes of switches $C_1$ and $C_3$ provided the speeds of rotation are modified and that there is established unused time intervals between two rotations corresponding to an effective scanning (rotation of $C_1$ at a speed of 200 revolutions per second comprising an effective rotation for every four rotations; the rotation of $C_2$ at a speed of 100 revolutions per second with one active revolution for every two).

All the devices shown in Fig. 6 being, with the exception of $S_1$, $R_1$ and R, arranged in the same place in the normal condition of exploitation (link centre of the telephone network), the adjustment and the regulation of phase will be made in the most favourable conditions.

The arrangement of Fig. 6 is adapted to a time multiplex transmission with, for instance, four channels according to my copending arrangement of Fig. 3 of the patent application, Ser. No. 54,394. Each one of the sources $S_1$ and $S_2$ corresponds according to the arrangement described above, to two transmission channels interleaved in time.

My copending patent application, Ser. No. 58,705, mentions in connection with Fig. 12, reproduced in the present application as Fig. 7, a system comprising in a reciprocal working, a delay line associated with a switch C and a sinusoidal source S. Let $\theta$ be the total delay of the line and let N represent the frequency of the source and let $N_1$ be the number of revolutions per second of the switch. There is then obtained for a rotation in the direction of arrow $f_1$ and for a working comprising impulse actions on the various electrodes of the switch, output currents representing respectively the following frequencies:

$$F_1=\frac{1}{(1-\theta N_1)}$$

$$F_2=\frac{1}{(1+\theta N_1)}$$

There is disposed, for a revolution of C made in an interval of time $$\frac{1}{N_1}$$

impulses representing a number of $$\frac{N}{N_1}$$

periods which come out in $S_1$ in an interval of time $$\left(\theta-\frac{1}{N_1}\right)$$

and from $S_2$ in an interval of time $$\left(\theta+\frac{1}{N_1}\right)$$

there result therefrom the values of $F_1$ and $F_2$ given above. The impulsive emissions are made preferably by means of an electronic beam suitably modulated from the signals outgoing from S. For a speed $N_1$, such that $$N_1=\frac{1}{\theta}$$

the frequency $F_1$ is theoretically infinite. This result is obvious since in this case there is concentrated in a space theoretically nil the impulses corresponding to one revolution of the switch.

Figure 8:
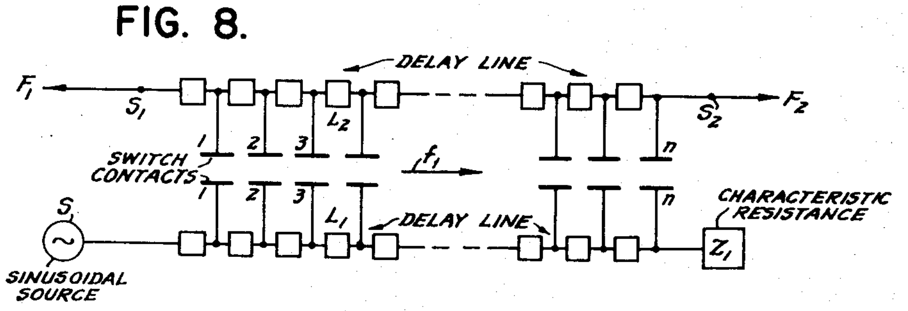
Fig. 8 is a schematic diagram illustrating the extension of the arrangement of Fig. 7 and incorporating the invention.

The present invention comprises an extension of the system of alteration of duration of signals represented in Fig. 7. The principal of this generalisation is given in Fig. 8. A source of signals S feeds a line $L_1$ having a total delay $\theta_1$, terminated on its characteristic impedance $Z_1$. A switch moving in the direction of arrow $f_1$ closes successively contacts $(l—l)$ . . . $(n—n)$ established respectively between consecutive cells of line $L_1$ and of line $L_2$ having a total delay $\theta_2$. At each closing of contact there is sent an impulse between the corresponding cells of $L_2$, this impulse is propagated in both directions; in the case in which the speed of scanning of the contacts is very great with respect to $\theta_2$ and $\theta_1$ there is a transfer over line $L_2$ of signals stored in line $L_1$ and the alteration of duration of the signal collected in $S_2$ is made in the ratio $$\frac{\theta_2}{\theta_1}$$

Figure 9:
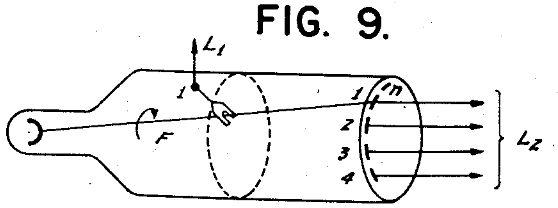
Fig. 9 is a schematic representation of an electronic switch which may be used with the invention.

Fig. 9 represents an electronic switch which can be used for these operations. At the back of the switch there is provided $n$ electrodes connected to tappings on line $L_2$; the electrodes connected to tappings of $L_1$ are arranged along a ring and each comprises an opening. There is a modulation of the beam F sent at constant intensity and moved along a circular scanning path during the passage through the electrodes connected to the tappings of $L_1$; the conjugated scanning of the electrode bearing the same number provides a transfer of signals from line $L_1$ to line $L_2$.

The invention is not limited to the examples above described which have been given merely as examples of embodiments of the invention and not as limiting its scope.

What is claimed is:

1. A communication system comprising a transmitter, a receiver, means at the transmitter for producing a signal to be transmitted, means for selecting and transmitting portions of said signal at regularly repeated time intervals, means at the receiver for intercepting the transmitted signal, signal reproducing means, means for feeding the signal directly from said intercepting means to said reproducing means, a delay line, means for feeding said signal from said intercepting means, through said delay line to said reproducing means, the delay of said line being such that the continuity of signals is preserved at said reproducing means by the alternate receipt of direct signals and signals from said delay line, and means for compensating for the attenuation of the signals passing through said delay line.

2. A communication system comprising a transmitter, a receiver, a plurality of means at the transmitter for producing independent signals, switch means for successively selecting and transmitting portions of each signal in interleaving relation with portions of the other signals, means controlled by said switch means, for transmitting a synchronizing signal, means at the receiver for intercepting said signals, separate reproducing means at the receiver for each signal, a delay line means for each reproducing means, means connected with each reproducing means for feeding signals from said intercepting means directly to said reproducing means, means connected with each reproducing means for feeding signals to said reproducing means through said delay line means, and synchronizing means connected between said signal intercepting means and said signal feeding means for blocking said feeding means except during intervals of time which contain the signals for the particular reproducing means.

3. A system according to claim 2, in which the feeding means includes amplifiers.

4. A system, according to claim 3, in which the gain of each amplifier associated with a delay line means is adjusted to compensate for attenuation in the delay line means.

5. A communication system comprising a transmitter, a receiver, means at the transmitter for producing a signal to be transmitted, means for selecting and transmitting successive portions of said signal at a predetermined rate of regularly repeated time intervals, means at the receiver for intercepting the transmitted portions of said signal and presenting them at the proper rate for reproduction, signal reproducing means, means for feeding the intercepted portions of said signal from said intercepting means directly to said reproducing means, a delay line, means for feeding the intercepted portions of said signal from said intercepting means through said delay line to said reproducing means, the delay of said line being such that the continuity of signals is preserved at said reproducing means by the alternate receipt of direct signals and signals from said delay line, and means for compensating for the attenuation of the signals passing through said delay line.

HENRI MAURICE VEAUX.

References Cited in the file of this patent

UNITED STATES PATENTS

| Number | Name | Date |
|---|---|---|
| 1,671,143 | Campbell | May 29, 1928 |
| 1,671,151 | French | May 29, 1928 |
| 1,735,037 | Corpe | Nov. 12, 1929 |
| 2,172,354 | Blumlein | Sept. 12, 1939 |
| 2,186,742 | White | Jan. 9, 1940 |
| 2,273,163 | Wilson | Feb. 17, 1942 |
| 2,401,464 | Corderman | June 4, 1946 |
| 2,414,265 | Lawson | Jan. 14, 1947 |

FOREIGN PATENTS

| Number | Country | Date |
|---|---|---|
| 259,328 | Great Britain | Oct. 14, 1926 |